Figure 1:
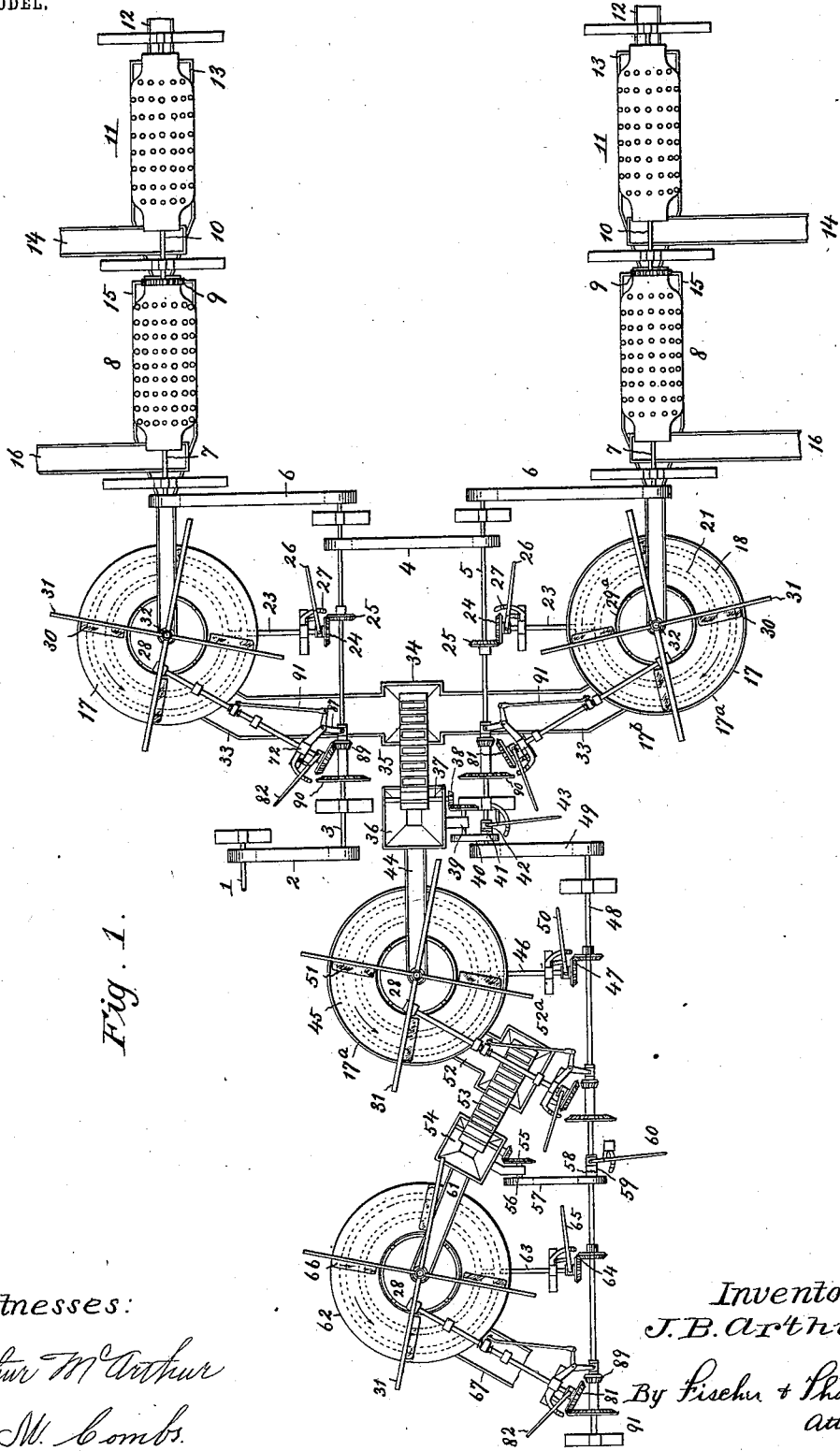

No. 722,933. PATENTED MAR. 17, 1903.
J. B. ARTHUR.
ORE CONCENTRATOR.
APPLICATION FILED MAR. 5, 1901. RENEWED AUG. 13, 1902.
NO MODEL. 3 SHEETS—SHEET 1.

Witnesses:
Arthur McArthur
R. M. Combs.

Inventor
J. B. Arthur.
By Fischer & Thorpe
Attys.

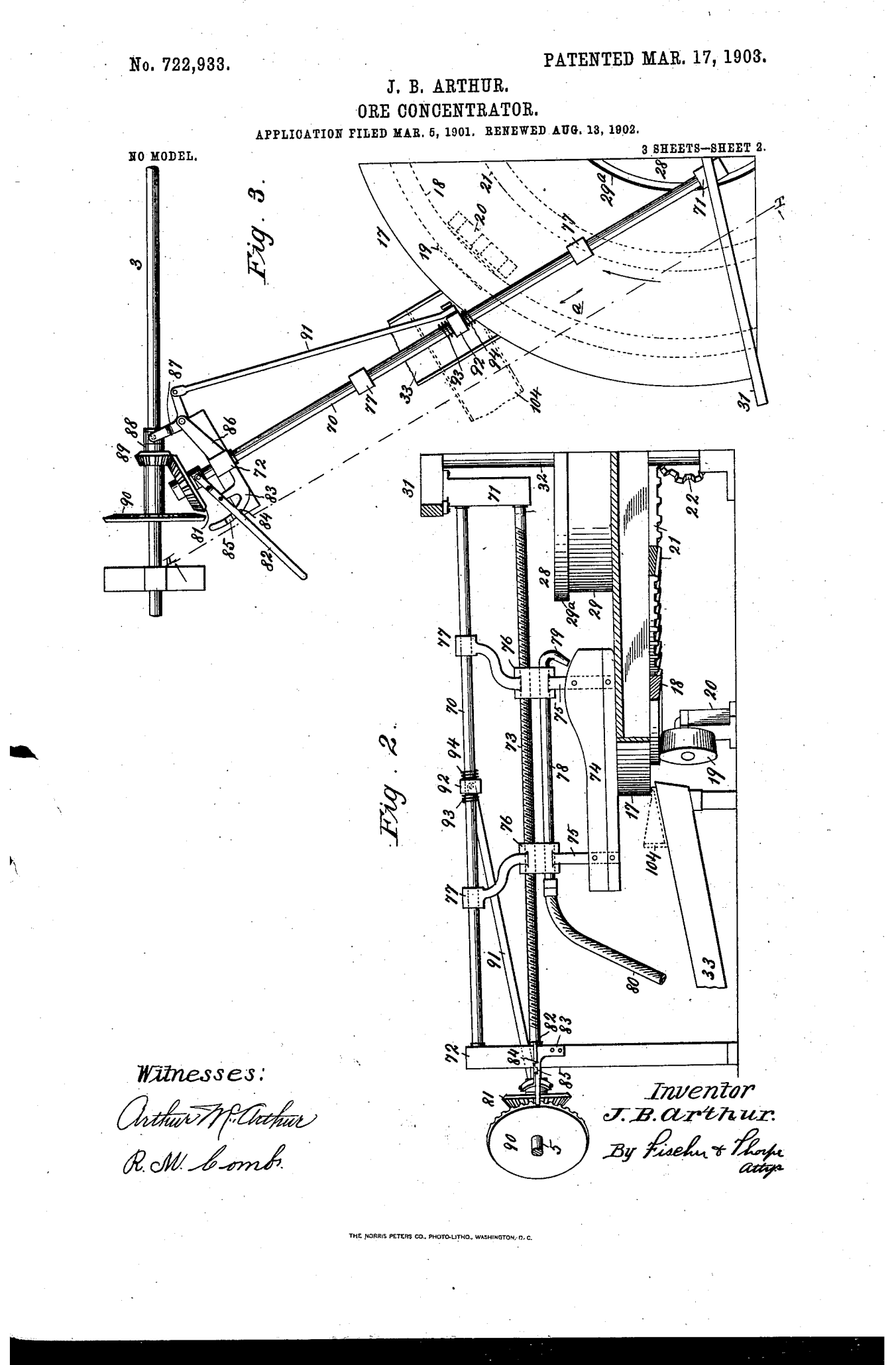

No. 722,933. PATENTED MAR. 17, 1903.
J. B. ARTHUR.
ORE CONCENTRATOR.
APPLICATION FILED MAR. 5, 1901. RENEWED AUG. 13, 1902.

NO MODEL. 3 SHEETS—SHEET 2.

Fig. 3.

Fig. 2.

Witnesses:
Arthur McArthur
R. M. Comb.

Inventor
J. B. Arthur.
By Fischer & Thorpe
attys

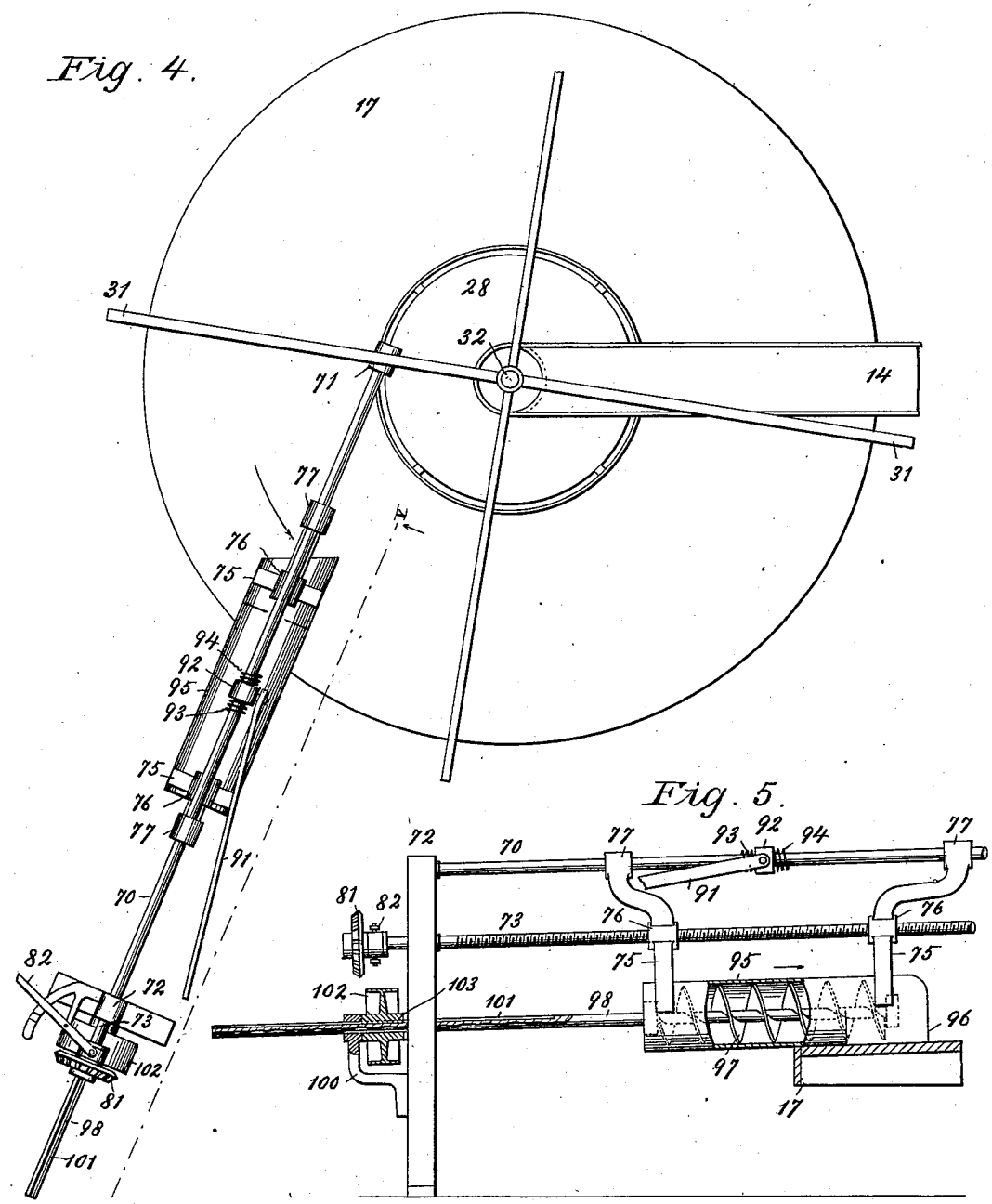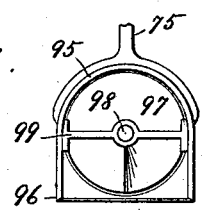

UNITED STATES PATENT OFFICE.

JAMES B. ARTHUR, OF KANSAS CITY, MISSOURI.

ORE-CONCENTRATOR.

SPECIFICATION forming part of Letters Patent No. 722,933, dated March 17, 1903.

Application filed March 5, 1901. Renewed August 13, 1902. Serial No. 119,583. (No model.)

*To all whom it may concern:*

Be it known that I, JAMES B. ARTHUR, a citizen of the United States, residing at Kansas City, Jackson county, Missouri, have invented a new and useful Ore-Concentrator, of which the following is a specification.

My invention relates to ore-concentrators, and more especially to that type for handling the kind of ore known as "jack," though it will be understood that it is intended for use in connection with any other kind of crushed ore.

The object of the invention is to produce a machine capable of handling and grading ore with greater rapidity than any other machine of like character with which I am familiar, thereby increasing the output of the mill wherein it is used and reducing the cost of operation.

With this general object in view and others, as hereinafter appear, the invention consists in certain novel and peculiar features of construction and combinations of parts, as hereinafter described and claimed, and in order that it may be fully understood reference is to be had to the accompanying drawings, in which—

Figure 1 represents a plan view of an ore-concentrator embodying my invention. Fig. 2 represents an enlarged vertical section showing the means for supporting and rotating the tables and the construction of knives employed for automatically and successively removing the mud and ore from the tables. Fig. 3 is a plan view of the construction shown in Fig. 2. Fig. 4 is a view similar to Fig. 3, but showing a different style of knife. Fig. 5 is a view similar to Fig. 2, but showing the style of knife shown in Fig. 4. Fig. 6 is an enlarged front view of the knife shown in Fig. 5.

Similar reference-numerals designate corresponding parts in all the figures.

In the said drawings, 1 designates a power or drive shaft belted, as at 2, to the shaft 3, which is in turn belted, as at 4, to a similar shaft 5. Said shafts are belted, as at 6, to shafts 7, carrying perforated hollow cylinders or sifters 8, and said cylinders are geared, as at 9, to shafts 10, upon which are mounted similar perforated cylinders 11, except that the perforations are larger in diameter than in the first-named cylinders.

12 designates sluice-boxes arranged to discharge crushed ore as it comes from the crusher or stamp-mill into cylinders 11, which as they revolve and feed the mass of crushed ore, mud, water, &c., toward their lower or discharge ends permit the finer particles of the same to sift through their perforations into the sluice-boxes 13 vertically below, the lumps of ore too large to pass through said perforations passing from the rear end of the cylinders into sluice-boxes 14, projecting to one side and adapted to conduct their contents to any point desired.

Sluice-boxes 13 discharge at their lower ends into cylinders 8, through the perforations of which the smaller particles of ore, &c., escape into sluice-boxes 15 vertically below, the larger particles passing from the rear end of the cylinders into the laterally-projecting sluice-boxes 16.

Sluice-boxes 15 are arranged to discharge centrally on the revolving tables 17, said tables when receiving ore being provided at their outer margins with a circular wall or rim 17[a] (shown in Fig. 1) for the purpose of preventing the ore, mud, &c., falling from the outer edge of the tables, the mass being of such consistency, however, that when the table is once filled said walls can be removed, leaving intact the mass upon the tables.

The tables 17 are provided with circular tracks 18 at their under side, which run with the minimum of friction upon the supporting-rollers 19, journaled in bearings 20, (see Fig. 2,) and to impart rotary movement gear-wheels 21 are secured to the under side of the tables and are engaged by cog-pinions 22, secured upon the outer ends of shafts 23. On the inner ends of said shafts adjustable bevel-gears 24 are mounted, engaging similar gears 25 on shafts 3 and 5, levers 26 being provided to slide gears 24 upon shafts 23 into or out of engagement with gears 25, the levers engaging sectors 27 to secure them in either position of adjustment.

The tables 17 are provided with raised central portions 28, upon which the ore is immediately discharged, vertical walls 29 supporting said raised portions and check-rails 29[a], secured a slight distance away from the edge of the raised portions in order that the ore, mud, &c., may be compelled to drop vertically downward upon the main portions of the tables against walls 29. This being accomplished, the heavier particles of ore accumulate close to said wall, the ring of ore being gradually increased in diameter as it accumulates upon the tables, with the lighter particles getting more and more remote from the center of rotation, while the mud, being the lightest, falls and works its way outward past the ore until checked by the walls $17^a$, against which it accumulates.

To compel the mud, ore, &c., to accumulate upon the tables to uniform depth, and therefore to the full capacity of the tables, flags or sweeps 30 are suspended from supporting-arms 31, the latter being preferably secured above the tables to the stationary shafts 32, around which the tables rotate.

33 designates a pair of sluice-boxes arranged to receive the ore from tables 17 in a manner hereinafter explained and conduct the joint product of said tables to a single bin 34, from which it is elevated by an endless conveyer 35, suitably mounted, to a hopper 36, wherein it is discharged, the endless conveyer being driven by a shaft 37, geared, as at 38, to a short shaft 39, belted, as at 40, to a clutch member 41, journaled upon shaft 5 by preference, a companion clutch member 42 being mounted to rotate with and slide upon said shaft in order to throw the conveyer in or out of gear with the power through the medium of the customary lever 43 or equivalent mechanism.

44 designates a sluice-box to conduct the contents of hopper 36 to and discharge it upon the rotary table 45, similar in all respects to tables 17 and adapted to be provided while rotating with a similar wall or rim $17^a$. Said table is supported and rotated by means similar to that shown in Fig. 2 for supporting and driving tables 17, the pinion (not shown) being mounted upon shaft 46, corresponding to shafts 43 and geared, as at 47, to the shaft 48, belted, as at 49, to shaft 5, by preference, and said table is adapted to be thrown into or out of gear with shaft 48 by a lever mechanism 50, similar to that above described for throwing shafts 23 in or out of gear with shafts 3 and 5. Like tables 17, flags or sweeps 51 are suspended over table 45, and the sluice-box 52, corresponding to sluice-box 33, arranged to conduct the ore from said table to a bin $52^a$, corresponding to bin 34, from which bin it is elevated by conveyer 53 into hopper 54, said conveyer being geared, as at 55, to a short shaft 56, belted, as at 57, to a clutch-section 58, journaled on shaft 48, the companion clutch-section 59 being thrown in or out of gear with clutch-section 58 by the usual lever 60.

Sluice-box 61 conducts the ore from hopper 54 to and upon table 62, similar in all respects to those above described and geared and supported likewise by shaft 63 and gear 64 to shaft 48, a lever 65 being adapted to throw the same in or out of gear in the manner described. The table is provided also with flags or sweeps 66 and a sluice-box 67 to carry the ore to another table or, if sufficiently refined, to any other suitable point, it being obvious that there may be any number of tables used that practice indicates are necessary.

In practice it is customary and is necessary, as these tables are now constructed, for laborers to shovel the mud and waste off the tables, being careful to separate the same from the ore to prevent loss. The ore is then shoveled off of one table and conveyed to another or any other suitable point.

With my revolving tables I provide means for automatically removing the mud and waste and then removing the ore and, if desired, grading the same. Referring to this mechanism and to Sheet 2 because it shows the preferred form of said mechanism and which, as it is the same for each table, is described in the singular, 70 designates a guide-rod extending almost tangentially of the raised portion of the table and beyond the outer edge of the same, being secured at its inner end to the arm 71, depending from one of the sweep-carrying arms and at its outer end to a standard 72, and carried by said arm and standard below and parallel with rod 70 is a worm-shaft 73.

74 designates a knife extending in the same direction as and below the worm-shaft and adapted to just scrape the upper edge of the table, as shown in Fig. 2. This knife is carried by rigid arms 75, formed with enlargements 76, mounted on the worm-shaft, and enlargements 77, slidingly mounted on rod 70 and adapted to assist in guiding the knife as it advances or recedes longitudinally, as hereinafter explained, and to hold it perfectly rigid as regards lateral movement, and carried also by said arms is a tube 78, provided at its inner end with a downwardly and outwardly extending discharge-nozzle 79, water discharged by said nozzle for softening and loosening the mass of ore and mud upon the table being supplied to said tube by the flexible tube 80 or in any other suitable manner. The condition of the mass upon the table will determine whether or not the use of water is desired, and if not the water-tube will of course be inoperative. A bevel-gear 81 is mounted to rotate with and slide upon the outer end of the worm-shaft, a lever 82, fulcrumed upon a sector-frame 83, being utilized for this purpose, the lever engaging notch 84 when the wheel 81 is in gear and 85 when said wheel is out of gear.

Cast with frame 83 or otherwise rigidly supported is an arm 86, upon which is fulcrumed a bell-crank 87, having one arm connected to slide sleeve 88 upon shaft 5 without interfering with the rotatable operation of said sleeve, and consequently with the small pinion 89 or large gear 90, cast with or secured to the opposite end of said sleeve.

91 designates a link pivotally connecting the other arm of the bell-crank with a collar 92, slidingly mounted on guide-rod 70 and provided with coil-springs 93 and 94 at its opposite sides.

Referring now to Figs. 4, 5, and 6, it will be noticed that I show a modified means of removing the mass of mud and ore from the tables, this modified means comprising a cylinder or scoop 95, having its front end at an angle to its axis and the lower half of said end sharpened and of rectangular configuration, as shown at 96, in order to present a wider mouth for the reception of the material. To convey the material reliably away from the table through said cylinder or scoop, a spiral conveyer 97 fits snugly therein, the front end of its shaft 98 being journaled in the crossbar 99, secured to the cylinder or scoop near its front end, while its opposite end is journaled in and adapted to slide through a bearing 100, secured to standard 72. The shaft is provided with a longitudinal groove 101, and mounted upon the shaft between the standard and said bearing is a belt-pulley 102, adapted to be driven by a belt (not shown) and impart movement to the shaft through the medium of the feather 103 engaging the groove without interfering with its longitudinal movement imparted to the cylinder or scoop and conveyer as a whole through the medium of the worm-gear hereinbefore described.

In the practical operation of the machine one of the tables 17 is adapted to receive ore, &c.—for instance, the table having the wall or rim 17ª shown thereon—while the companion table, from which the wall or rim has been removed, is having the mass of mud, ore, &c., automatically removed through the medium of knife 74 or the equivalent mechanism shown on Sheet 3, the arrangement and construction being such that a considerable amount of labor needed by the old style machine is rendered unnecessary. Assuming now that crushed ore, mud, and water is being fed from the lower sluice 12 to the lower table 17 through the intermediate apparatus described and that the upper table is loaded and ready to discharge, the attendant throws gear-wheel 81 of the upper knife mechanism into gear with pinion 89 of shaft 3, as shown in Fig. 3, the result being the revolution of the worm-shaft and the consequent inward travel of the knife upon the table. This inward movement of the knife, because of the gearing employed, is slow as compared to the operation of the table, and the material on the latter is pared off and follows the knife out in the direction indicated by the arrow $a$, Fig. 3, and the greater the angle of the knife to the table the easier and quicker this is effected, as will be readily understood. As the mud, as hereinbefore explained, occupies the outer portion of the table, it is first removed by the knife, and to catch the same and conduct it off to a suitable point the attendant places a temporary sluice-box 104 upon the receiving-point of the permanent sluice-box. (See Figs. 2 and 3.) When all of the mud has been removed, if it be desired to grade the ore, the temporary box 104 is removed and replaced by a similar one wherein the ore is discharged until practically all of that grade has been removed, and the coarser grade is ready to follow. He then removes said second temporary sluice-box and permits the remaining ore to be discharged by the knife into sluice-box 33, all of it being removed by the time the knife has reached wall 29 of the table, at which time the direction of movement of the knife is reversed automatically because its rear or outer arm 77, by striking the comparatively stiff spring 93, first slides collar 92 forward a sufficient distance to operate the bell-crank 87 through the medium of link 91 and withdraw the pinion 89 out of engagement with gear-wheel 81, when the forward movement of the knife instantly ceases and is immediately followed by a reverse movement, because the compressed spring 93, as the knife movement ceases, throws gear-wheel 90 into engagement with gear-wheel 81. As a result the worm-shaft is rotated in the opposite direction to its first movement and very much more rapidly because of the disproportion between the former driving gear-pinion 89 to the present driving gear-wheel 90. The reverse movement of the knife is therefore many times as fast as its forward movement, as will be readily understood. Just before the outward limit of knife movement is attained the front or inner arm 77 compresses spring 94 and slides collar 92 forward sufficiently to disengage gear-wheel 90 from gear-wheel 81, when the knife movement instantly ceases. As this movement ceases the spring 94 instantly expands and pushes collar 92 still farther forward, so as to throw gear-pinion 89 again into engagement with gear-wheel 81 when the knife again advances. If the table is not rotating at this time, however, the attendant prevents the knife moving inward again by immediately throwing lever 82 into engagement with notch 85, and thereby withdrawing gear-wheel 81 from engagement with cog-pinion 89. At the time the load is removed from this table 17 and the rim or wall 17ª secured thereto the other table is charged and ready to be relieved of such charge. The attendant therefore throws the upper table again in gear with the apparatus for supplying crushed ore, mud, &c., removes the rim or wall from the lower table, and throws the corresponding knife in gear therewith to remove its mud and the ore in the manner hereinbefore explained. Each table delivers its ore through sluice-boxes 13 to the common bin 34, from which it is conveyed by elevator 35 to the hopper 36, from whence it passes through sluice-boxes 44 onto table 45, where it is treated, as above described, with reference to the other tables in order to remove practically all of the mud. To receive the mud removed from said tables, a temporary sluice-box, like that shown at 104, is used and is then removed to permit the ore to pass into sluice-box 52 and thence to bin 52ᵃ, from which it is conveyed by elevator 53 to hopper 54 and then through sluice-box 61 to table 62, where it is again refined. It is delivered from this table in the manner already explained and may be conducted to any suitable point or run over other refining-tables, if desired.

The mechanism for removing the mud, ore, &c., (shown on Sheet 3,) is manipulated in precisely the manner described in connection with knife 74 and under certain conditions may, perhaps, be found of superior utility to knife 74. In general, however, the latter will operate satisfactorily and on account of its cheapness is preferred.

From the above description it will be apparent that I have produced an ore-concentrator which embodies the features of advantage enumerated as desirable in the statement of invention, and while I have illustrated and described the preferred embodiment of the same it is obvious that it is susceptible of various changes in the form, proportion, detail construction, and arrangement of the parts without departing from the spirit and scope of the invention.

Having thus described the invention, what I claim as new, and desire to secure by Letters Patent, is—

1. In an ore-concentrating machine, a table, a knife or scoop arranged to remove accumulations of ore, mud, &c., upon the table, parallel worm and guide-rods, a frame secured to the knife or scoop and engaging the worm and guide-rods, and means for rotating the worm and causing advance or retrograde movement on the part of the scoop or knife, substantially as described.

2. In an ore-concentrating machine, a table, a knife or scoop arranged to remove accumulations of ore, mud, &c., upon the table, parallel worm and guide-rods, a frame secured to the knife or scoop and engaging the worm and guide-rods, a collar upon the rod provided with springs at opposite sides, means for rotating the worm and causing the knife to travel and its frame to compress the contiguous collar-spring and then slide said collar, and connections whereby the movement of said collar effects the reversion of the worm operation and consequently the knife and frame, substantially as described.

3. In an ore-concentrating machine, a table, a knife or scoop arranged to remove accumulations therefrom, a frame carrying the knife and provided with enlargements, a worm engaging said enlargements for the purpose of reciprocating the knife, a tube secured in said enlargements and provided with a nozzle for discharging water upon the table contiguous to the path of the knife, a flexible tube connecting the first-named tube with the source of supply, and means for rotating the worm in one direction or the other, substantially as described.

4. In an ore-concentrating machine, a table, a knife or scoop arranged to remove accumulations therefrom, a worm suitably journaled and extending parallel with the knife, a parallel guide-rod suitably supported, a frame secured to the knife and provided with internally-threaded enlargements engaging the worm and enlargements slidingly engaging the guide-rod, a collar slidingly mounted on the rod between the last-named enlargements and provided with springs at its opposite sides, a shaft provided with driven gears of different diameter, a gear-wheel mounted on the worm and adapted to be thrown in or out of engagement with either of said driven gears, a bell-crank arranged to reciprocate said driven gears and throw one or the other into engagement with the gear-wheel of the worm, and a link pivotally connecting said bell-crank with said sliding collar, substantially as described.

5. In an ore-concentrating machine, a rotating table upon which crushed or pulverized ore and foreign matter is gathered, and means for removing the accumulated ore and foreign matter, comprising a knife or scoop supported in such position that it shall scrape the table, a worm-shaft suitably driven and adapted to effect the longitudinal feed of the knife or scoop, a gear-wheel upon the worm-shaft, a driven shaft, a pair of gear-wheels rotating therewith but of different diameter, and adapted to alternately engage the gear-wheel of the worm-shaft, a collar suitably supported and adapted to be moved by the knife or scoop as its limit in one direction is attained, instrumentalities connecting said collar with the gear-wheels of said driven shaft for the purpose of moving them simultaneously and alternately in and out of gear with the worm-shaft gear-wheel, and arranged to be placed under strain by the action of the knife upon said collar, and thereby act to continue the movement imparted to the collar by the knife, substantially as described.

In testimony whereof I affix my signature in the presence of two witnesses.

JAMES B. ARTHUR.

Witnesses:
H. C. RODGERS,
G. Y. THORPE.